United States Patent [19]

Tominari et al.

[11] 4,121,837

[45] Oct. 24, 1978

[54] RECORD PLAYER HAVING A DEVICE FOR DAMPING VIBRATIONS OF A TONE ARM

[75] Inventors: Noboru Tominari, Tokyo; Hiroshi Takahashi, Yokohama, both of Japan

[73] Assignee: Onlife Research, Inc., Tokyo, Japan

[21] Appl. No.: 804,818

[22] Filed: Jun. 8, 1977

[30] Foreign Application Priority Data

Jun. 11, 1976 [JP]  Japan .............................. 51-75139[U]
Jun. 11, 1976 [JP]  Japan .............................. 51-75140[U]

[51] Int. Cl.$^2$ .............................................. G11B 3/10
[52] U.S. Cl. ................................................. 274/23 R
[58] Field of Search .................... 274/23 R, 23 A, 1 R

[56] References Cited

U.S. PATENT DOCUMENTS

| | | | |
|---|---|---|---|
| 1,212,692 | 1/1917 | Ruckgaber | 274/39 R |
| 2,924,461 | 2/1960 | Bobb et al. | 274/23 R |
| 2,983,516 | 5/1961 | Bauer et al. | 274/23 R |
| 3,366,382 | 1/1968 | Haddy | 274/23 R |

FOREIGN PATENT DOCUMENTS

450,752  4/1968  Switzerland .......................... 274/23 R

*Primary Examiner*—Richard E. Aegerter
*Assistant Examiner*—John W. Shepperd
*Attorney, Agent, or Firm*—Haseltine, Lake, & Waters

[57] ABSTRACT

A record player comprises a tone arm provided at the distal end thereof with a pickup cartridge, and a vibration damping device for damping a resonance of the tone arm. The damping device comprises a damping member made of an electrically conductive material and provided at the tone arm in a manner to vibrate unitarily therewith, and a damping unit inclusive of permanent magnet means for forming a magnetic field with respect to the damping member. Eddy currents are generated in the damping member when the damping member vibrates in the magnetic field, whereby damping of the vibration of the damping member and the tone arm is accomplished. The damping device may further comprise an elastic member supported at one end thereof at the tone arm and having another free end and a weight secured to the free end of the elastic member.

5 Claims, 14 Drawing Figures

RECORD PLAYER HAVING A DEVICE FOR DAMPING VIBRATIONS OF A TONE ARM

BACKGROUND OF THE INVENTION

The present invention relates generally to record players having devices for absorbing or damping the vibrations of their tone arms, and more particularly to a record player in which is provided a vibration absorbing or damping device for effectively damping unwanted resonance due to the compliance of a cantilever of a pickup cartridge and to the equivalent inertial mass of the tone arm.

In a record player, in general, a resonance phenomenon referred as a so-called arm resonance occurs as a result of the compliance of the cantilever of the pickup cartridge and the equivalent inertial mass of the tone arm. This arm resonance produces a peak of the order of 10 to 20 dB in the vicinity of approximately 5 to 10 Hz in a frequency characteristic, depending on the values of the above mentioned compliance and the equivalent inertial mass. For this reason, this arm resonance gives rise to a deterioration of the reproducing characteristics at low frequencies.

The reproducing performance of a tone arm may be broadly divided into a low-frequency reproducing performance and a tracing performance. In order to improve the low-frequency reproducing performance, it is necessary to decrease as much as possible the unwanted resonance peak due to the above mentioned arm resonance thereby to suppress the occurence of effects of cross-modulation distortion and the like. One expedient for preventing the occurrence of this arm resonance would appear to be to increase the resistance of the rotational pivot point of the tone arm thereby to damp the arm resonance.

However, the trend in recent years has been toward a reduction to a minimum of the resistance of this rotational pivot point of the tone arm in order to improve the above mentioned tracing performance. Consequently, if the pivot resistance of the tone arm were to be increased in order to damp the arm resonance, the tracing performance would be caused to deteriorate. Accordingly, it has not been possible to satisfy the improvements of both the low-frequency reproducing performance and the tracing performance by suitable selection of the value of the pivot resistance of the tone arm.

Therefore, there has been a need for a record player in which the pivot resistance of the tone arm is made low thereby to improve the tracing performance, and the arm resonance is reduced by some means thereby to improve the lowfrequency reproducing performance.

SUMMARY OF THE INVENTION

Accordingly, it is a general object of the present invention to provide a novel and useful record player having a device for absorbing or damping vibrations of the tone arm which satisfies the above stated needs.

Another and specific object of the invention is to provide a record player having a vibration absorbing device for attenuating or damping the resonant vibration of the tone arm thereby to reduce the arm resonance without increasing the pivot resistance of the tone arm.

Still another object of the invention is to provide a record player having a vibration absorbing devide for damping resonant vibration of the tone arm by utilizing eddy current loss due to electromagnetic induction.

A further object of the invention is to provide a record player having a vibration absorbing device including a dynamic damper for damping resonant vibration of the tone arm by coupled vibration.

Other objects and further features of the invention will be apparent from the following detailed description when read in conjunction with the accompanying drawings.

DETAILED DESCRIPTION

Figure 1:
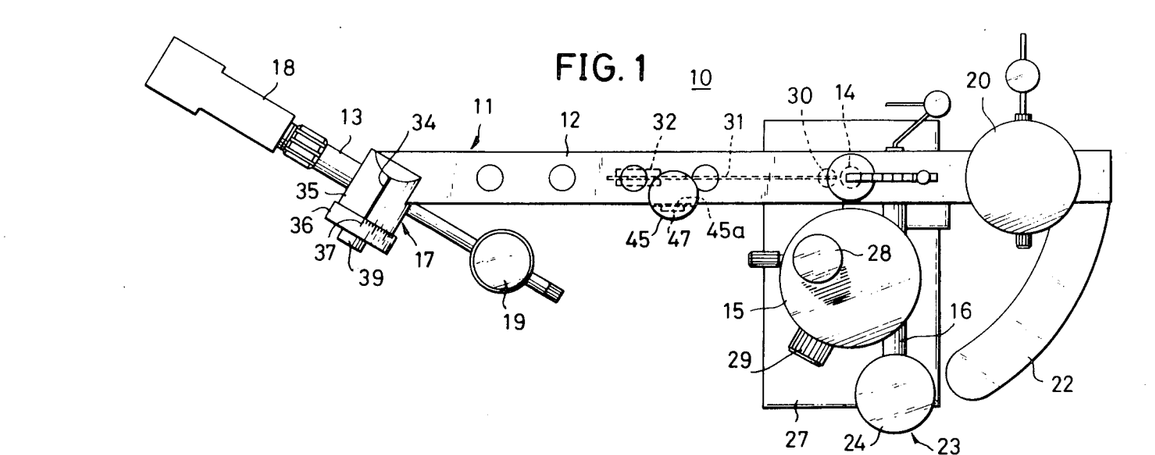
FIG. 1 is a plan view of one embodiment of a record player constituting a preferred embodiemtn of the invention.
Figure 2:
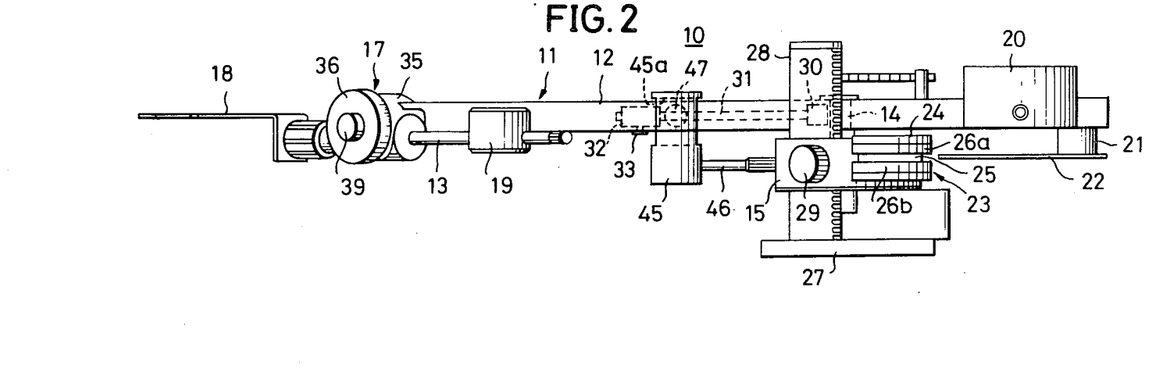
FIG. 2 is a side elevation of the record player illustrated in FIG. 1.
Figure 3:
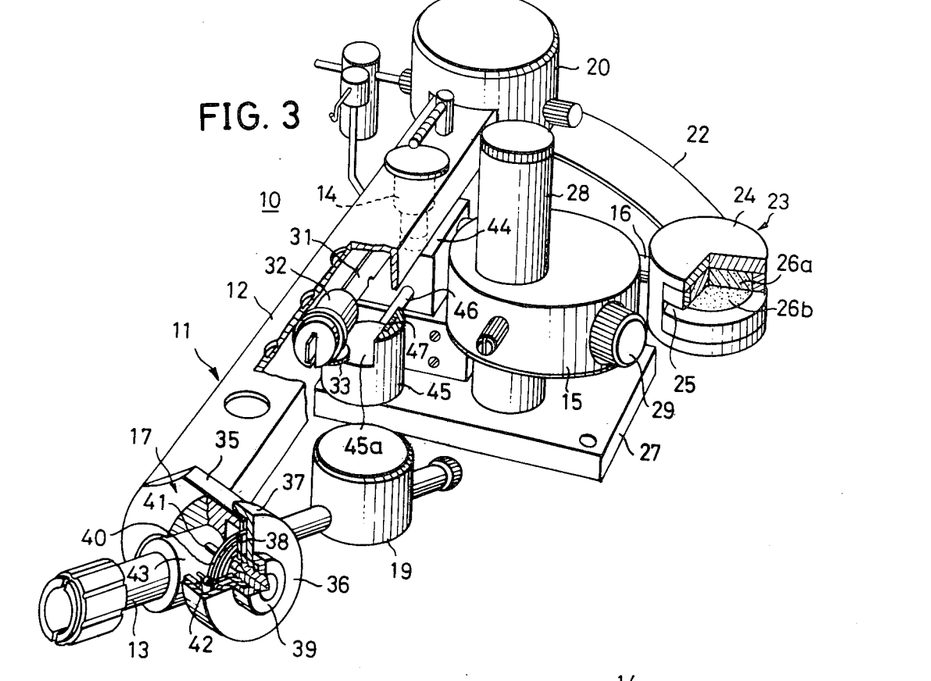
FIG. 3 is a perspective view, with parts cut away, showing the essential parts of the same record player.

In the record player 10 illustrated in FIGS. 1 through 3, the tone arm 11 comprises a main arm 12 and a sub-arm 13. The main arm 12 can swing freely in a horizontal plane about a vertical shaft 14 supported by a block 44, and can move in a vertical plane together with the block 44 which is fixed to a horizontally extending shaft 16 rotatably supported by a block 15. The sub-arm 13 is rotatably supported in a manner permitting it to swing freely in a vertical plane at a stylus pressure adjusting device 17 mounted on the forward end part of the main arm 12. A cartridge shell 18 for loading a pickup cartridge is mounted on the forward end part of the sub-arm 13, and a counterbalance weight 19 is adjustably secured to the rear part of the sub-arm 13.

A counterbalance weight 20 is mounted on the rear part of the main arm 12. A support post 21 is fixed to the lower surface of the rear end of the main arm 12 and fixedly supports one end of an arcuate damping plate 22 made of an electrically conductive material and lying in a horizontal plane, the center of the arc of its arcuate shape being the above mentioned vertical shaft 14. A damping unit 23 is fixedly mounted on the outer end of the shaft 16. This damping unit 23 comprises a support member 24 fixed to the outer end of the shaft 16 and a pair of permanent magnets 26a and 26b confronted with a gap 25 therebetween and fixedly supported by the support member 24.

Figure 5:
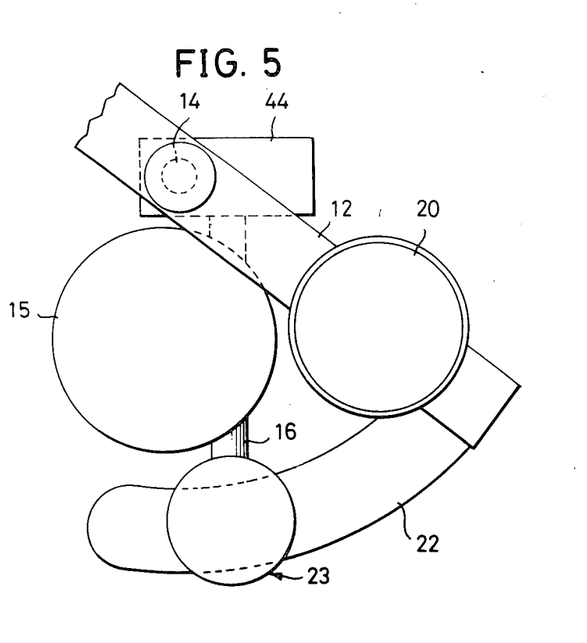
FIG. 5 is a plan view showing an essential part of the record player shown in FIG. 1 with the tone arm in rotated state.

When the tone arm 11 is swung in a horizontal plane about the shaft 14 toward the record playing position, the damping plate 22 is inserted from its outer free end into the gap 25 of the damping unit 23 in a state wherein it does not contact the permanent magnets 26a and 26b, as indicated in FIG. 5. If, during the playing of a record when the damping plate 22 is inserted in the gap 25 of the damping unit 23, the tone arm 11 is swung upward in order to stop the playing of the record, the rotation of the tone arm 11 will not be obstructed by the damping plate 22 and the damping unit 23 since the damping unit 23 rotates together with the block 44 and the tone arm 11, being connected thereto by way of the shaft 16.

The above mentioned block 15 is vertically movable on and relative to a support post 28 embeddedly fixed at its lower end to a base structure 27. By turning a knob 29 provided at the side of this block 15, the block 15 is moved up and down unitarily with the tone arm 11, the block 44, the shaft 16 and the damping unit 23 thereby to set the height position thereof.

Figure 4:
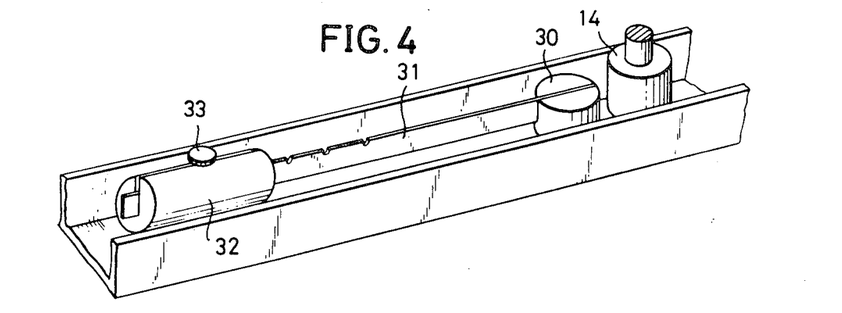
FIG. 4 is a bottom perspective view of one art of the tone arm of the same record player.

The structural part of the main arm 12 is of substantially channel form, and supports a supporting member 30 fixed to its bottom surface in the vicinity of the shaft 14 as best shown in the bottom perspective view of FIG. 4. A leaf spring 31 disposed longitudinally within the main arm 12 is fixed at its rear end to the supporting member 30 and supports at its front free end a weight 32, which is adjustably set in longitudinal position relative to the leaf spring 31 by a screw 33. The leaf spring 31 is disposed such that the plane thereof is vertical and is horizontally swingable.

The aforementioned stylus pressure adjusting device 17 has a cylindrical casing 35 with a reference line 34 marked thereon and a stylus pressure adjusting knob 36 rotatably supported at an end part of the casing 35 and having inscribed on its outer periphery a calibration scale 37 indicating the stylus pressure in conjunction with the reference line 34. The knob 36 and a disc 38 are pressed against a bearing retainer 39 by a disk shape spring (not shown). The inner end of a spiral spring 40 is fixedly anchored to a transverse shaft 41, while the outer end of the spiral spring 40 is fixed to a pin 42 fixed to the disc 38 and the knob 36. Here, the force of the spiral spring 40 is less than the pressing force of the knob 36 and the disc 38 against the bearing retainer 39. The transverse shaft 41 is fixed to a holder 43 of the sub-arm 13.

When the knob 36 is turned, the pin 42 also undergoes rotational displacement unitarily therewith, and the force of the spiral spring 40 is adjusted. Thus, the torque exerted on the shaft 41 by the spiral spring 40 is adjusted, and, accordingly, the pressing force of the stylus of the pickup cartridge is adjusted by way of the sub-arm 13. The stylus pressing force at this time is indicated by the reference line 34 on the stylus force scale 37 on the knob 36.

An arm rest 45 is supported by a support rod 46 secured to the block 44. The arm rest 45 has a cut out recess 45a which has a vertical inner wall surface and into which the main arm 12 fits. A permanent magnet 47 for attracting the main arm 12 and holding the same in its rest position is embedded in the inner wall surface of the cut out recess.

Figure 6A:
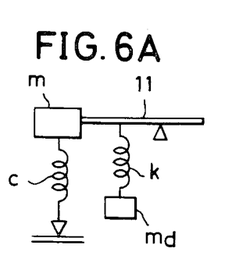
FIG. 6A and 6B are diagrammatic model views respectively representing vibration systems wherein dynamic dampers are considered.

The vibration system of the tone arm 11 inclusive of the dynamic damper comprising the leaf spring 31 and the weight 32 will now be considered. The general composition of this vibration system is indicated in FIG. 6A. For the following analysis: the spring constant of the leaf spring 31 constituting an elastic structure of the dynamic damper will be designated by $k$; the mass of the weight 32 by $md$; the compliance of the cartridge by $c$; and the equivalent mass of the tone arm 11 by $m$. The arm resonance frequency of the tone arm 11 is represent as follows.

$$f = \frac{1}{2\pi} \sqrt{\frac{1}{mc}} \quad (Hz)$$

Furthermore, the resonance frequency of the dynamic damper, $fd$, is expressed as follows.

$$fd = \frac{1}{2\pi} \sqrt{\frac{k}{md}}$$

Then, by making the above frequencies $f$ and $fd$ equal to each other, the peak of the arm resonance is changed to a dip in a frequency characteristic by the coupled vibration of the arm system and the dynamic damper system.

Figure 8A:
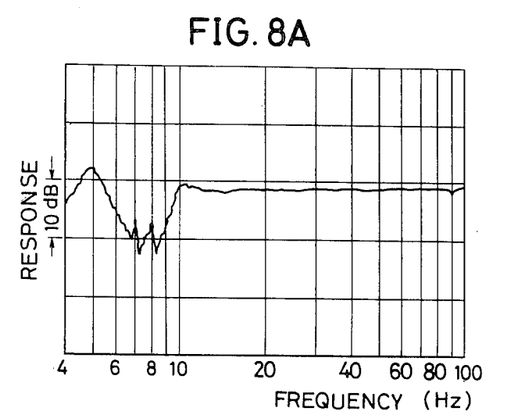
FIGS. 8A, 8B, 8C, and 8D are graphs respectively indicating frequency characteristics of response in the case where a damper is not used, the case where only a dynamic damper is used, the case where a dynamic damper and an electromagnetic damper are used, and the case where only an electromagnetic damper is used.

A frequency characteristic accompanied by the arm resonance of the tone arm 11 in the case where the above described dynamic damper and the electromagnetic damper comprising the damping unit 23 and the damping plate 22 are not used is as indicated in FIG. 8A. As is apparent from this graph, the characteristic is substantially flat at frequencies above approximately 15 Hz, but there is a large peak at approximately 5 Hz because of arm resonance. It can be observed, furthermore, that a peak is produced also at approximately 10 Hz.

Figure 8B:
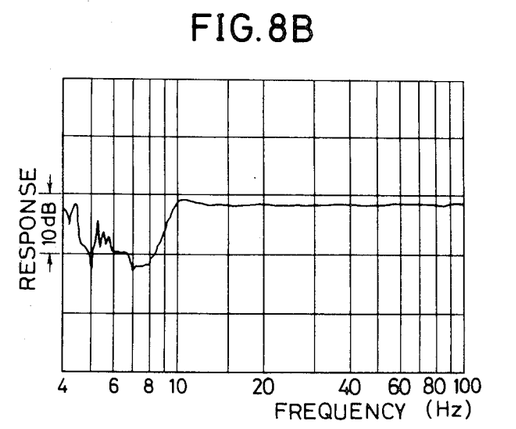

Accordingly, by providing a dynamic damper comprising the leaf spring 31 and the weight 32, the peak at 5 Hz is changed into a dip in the frequency characteristic by the above mentioned coupled vibration, and the characteristic of the entire system becomes as indicated in FIG. 8B.

Figure 6B:
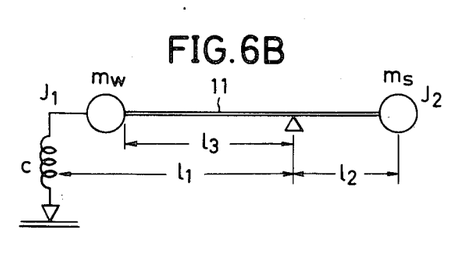

A method of designing a dynamic damper so that it will produce a coupled vibration such as to change the peak into a dip in the frequency characteristic as mentioned above will now be described. In the vibration system illustrated in FIG. 6B, it will be assumed that, as one specific example: the cartridge compliance $c$ is $15 \times 10^{-6}$ cm./dyne; the effective length $l_1$ of the tone arm is 24 cm.; the distance $l_2$ from the pivot support point to the center of the balance weight is 7 cm.; the distance $l_3$ from the pivot support point to the center of the sub-arm is 16 cm.; the mass $m_w$ of the balance weight is 200 grams (gr.); and the total mass $m_s$ of the front part of the tone arm is 100 gr. Then, the moment of inertia J is determined as follows.

$$J = J_1 + J_2 = m_s l_3^2 + m_w l_2^2 = 3.54 \times 10^4$$
$$(dyne.cm.sec^2.)$$

The resonance point frequency $f$ is then as follows.

$$f = \frac{1}{2\pi} \sqrt{\frac{f_1^2}{J_c}} = \frac{1}{2\pi} \sqrt{\frac{24^2}{15 \times 10^{-6} \times 3.54 \times 10^4}} = 5.2 \text{ Hz}$$

Here, the rigidity of the leaf spring 31 is as follows.

$$K = \frac{Ebt^3}{4l^3(1-\mu^2)} \quad (\text{Kgr./mm.})$$

Here, if it is assumed that: the constant E is $1.1 \times 10^4$ Kgr./mm.$^2$ in the case where phosphor bronze is used for the leaf spring 31; the leaf spring width b is 4mm.; the leaf spring thickness t is 0.2 mm., and the poisson ratio is 0.3, then, $$K = \frac{1}{l^3} \times 97.78 \text{ (Kgr./mm)}$$

$$= \frac{1}{l^3} \times 9.778 \times 10^4 \text{ (gr/mm)}$$

If the mass md of the weight 32 used is taken as approximately 7 gr., from the equation $$fd = \frac{1}{2\pi} \sqrt{\frac{kg}{md}}$$

for the resonance frequency fd, the value of K is as follows.

$$K = \frac{(2\pi fd)^2 \cdot md}{g} = \frac{1}{l^3} \times 9.778 \times 10^4$$

Accordingly, in order to obtain a resonance point of the dynamic damper of 5 Hz, the length l of the leaf spring 31 must be as follows.

$$l = \sqrt[3]{\frac{9.778 \times 10^4 \times g}{(2\pi \times 5)^2 \times 7}} \approx 51.7 \text{ mm.}$$

Therefore, in the case of the above example of numerical values, by securing the weight 32 at a position approximately 51.7 mm. from the support member 30 of the leaf spring 31, a characteristic as indicated in FIG. 8B is obtained as a result of the coupled vibration.

On the other hand, when the tone arm has been swung to its record playing position, the damping plate 22 is inserted in the gap 25 of the damping unit 23. Accordingly, when the tone arm vibrates in the horizontal direction as a result of the arm resonance, the damping plate 22 also vibrates in the horizontal direction in the gap 25 of the damping unit 23.

In general, within an electrical conductor moving in a uniform magnetic field, electric eddy currents are caused to flow by electromagnetic induction. This eddy current flow within a plane perpendicular to the magnetic flux generates Joule heat, giving rise to a heat loss. This eddy current loss hinders the movement of the conductor within the magnetic field. Here, the damping coefficient Cd is expressed by the following equation in relation to the volume V of the air gap forming the magnetic field, the resistivity $\rho$ of the conductor, and the magnetic flux density B.

$$Cd = 10^{-14} \frac{V}{\rho} B^2$$

Figure 7:
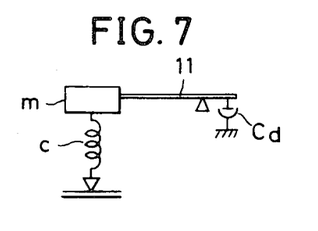
FIG. 7 is a diagrammatic model view of a vibration system wherein an electromagnetic damper is considered.

A general vibration model is illustrated in FIG. 7.

A magnetic field is established in the gap 25 by the permanent magnets 26a and 26b of the damping unit 23. For this reason, when the damping plate 22 is caused to vibrate within this gap 25 by the arm resonance as described hereinabove. eddy currents are cuased to flow in the damping plate 22 made of conductor by electromagnetic induction, and the vibration of this damping plate 22 is damped as a result of the loss thus produced.

Figure 8C:
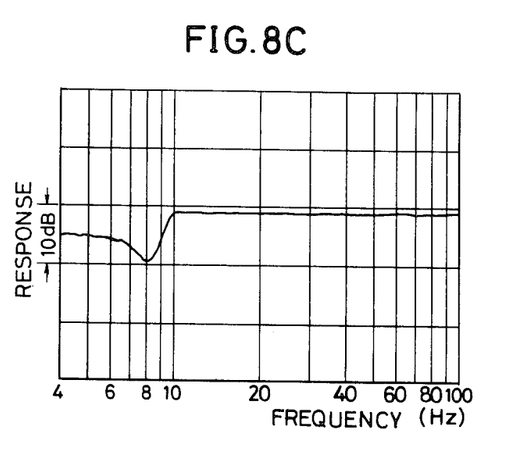

Accordingly, when this electromagnetic damper is used in conjunction with the aforedescribed dynamic damper, the small crests and valleys in the characteristic indicated in FIG. 8B are smoothed flat, and a characteristic which, as a whole, is as indicated in FIG. 8C, is obtained.

Figure 8D:
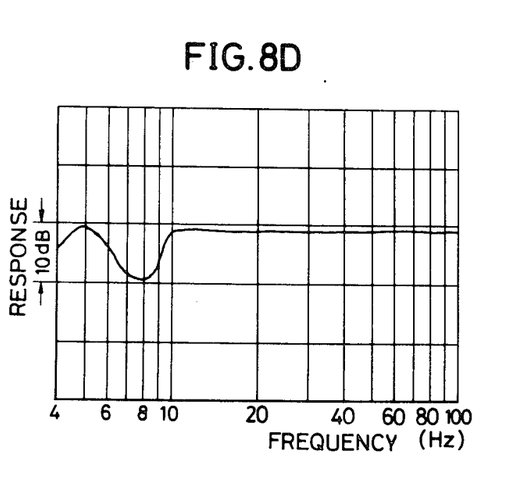

This electromagnetic damper need not be used in conjunction with a dynamic damper. When only a damping means comprising the above described damping unit 23 and damping plate 22 is used, a characteristic as indicated in FIG. 8D is obtained. As is apparent from a comparison of FIG. 8A and 8D, the peak due to the arm resonance is reduced.

Since, in the instant embodiment of the invention, the diameter of the permanent magnets 26a and 26b is 19 mm., and the gap of the air gap 25 is 2 mm., for example, $$V = (\frac{19}{2})^2 \pi \times 2 = 567 \text{ mm}^3.$$

Furthermore, in the case where B is 5,000 gauses, and copper is used for the damping plate 22, $$\rho = 1.7 \times 10^{-8}$$

Therefore, $$Cd = 10^{-14} \times \frac{567}{1.7 \times 10^{-8}} \times 5,000^2$$

$$= 8.34 \times 10^3 \text{ (gr/sec.} = \text{dyne. sec/cm.)}$$

The above described embodiment of the invention has a structural arrangement wherein the vibration damping device comprising damping means is provided on the main arm 12, and vibration of the tone arm 11 in the horizontal plane is damped, but an alternative arrangement wherein the vibration damping device is provided on the sub-arm 13, and vibration in a vertical plane is damped may be used. Embodiments of this alternative arrangement of the invention will now be described with reference to FIGS. 9 and 10.

Figure 9:
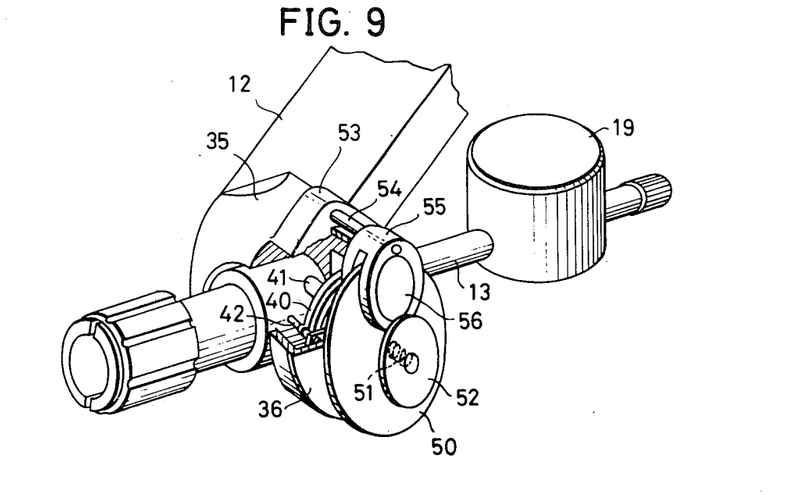
FIG. 9 is a partial perspective view showing one embodiment of a vibration damping device provided in a sub-arm of a tone arm of the record player.

In FIG. 9, those parts which are the same as corresponding parts in FIG. 3 are designated by like reference numerals. Detailed description of such parts will be omitted. On the outer side of the knob 36, a damping disc 50 made of an electrically conductive material is fixed to the outwardly extending end of the shaft 41, and, furthermore, a coil spring 51 is fixed coaxially with this damping disc 50. A disc-shaped weight 52 is fixed to an end part of the coil spring 51. The casing 35 has a projection 53 supporting, by way of a beam 54, a holding member 55. The holding member 55 holds a pair of permanent magnets 56 forming therebetween a gap into which the damping disc 50 is inserted.

When the sub-arm 13 vibrates up and down in a vertical plane, the damping disc 50 also undergoes rotational vibration together with the shaft 41. Here, the coil spring 51 and the weight 52 constitute a dynamic damper. Furthermore, the permanent magnets 56 and the damping disc 50 constitute an electromagnetic damper. Therefore, as is easily understandable from the operation of the above described embodiment of the invention, the vertical vibration of the sub-arm 13 is effectively damped by these dampers.

Figure 10:
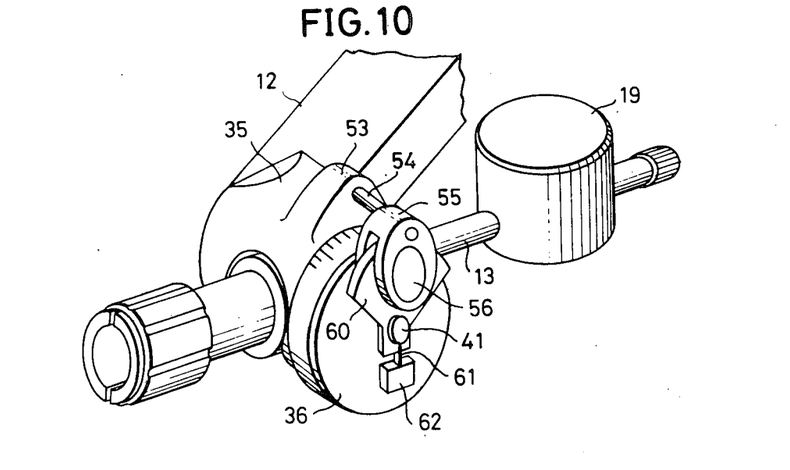
FIG. 10 is a partial perspective view showing another embodiment of a vibration damping device provided in the sub-arm.

In another embodiment illustrated in FIG. 10, those parts which are the same as corresponding parts in FIGS. 3 and 9 are designated by like reference numerals. Detailed description of these parts will not be repeated. On the outer side of the knob 36, a damping plate 60 of fan or sector shape made of an electrically conductive material is fixed to the outwardly extending end part of the shaft 41. The damping plate 60 is inserted into a gap between the pair of permanent magnets 56. A weight 62 is suspended by way of a leaf spring 61 from the lower part of the damping plate 60 on the side of the shaft 41 opposite from the sector-shaped part of the damping plate 60.

When the sub-arm 13 vibrates up and down in a vertical plane, the damping plate 60 also undergoes swinging vibration together with the shaft 41. Here, the leaf spring 61 and the weight 62 constitute a dynamic damper, while the permanent magnets 56 and the damping plate 60 constitute an electromagnetic damper. These dampers function to effectively damp the vibration of the sub-arm 13.

Further, this invention is not limited to these embodiments but various variations and modifications may be made without departing from the scope and spirit of the invention.

What is claimed is:

1. A record player comprising:
    a tone arm having a main arm and a sub-arm, said sub-arm being pivotably mounted with a shaft on a forward end of the main arm to rotate in swinging movement in a vertical plane and having a pickup cartridge mounted thereon;
    pivoting means for pivoting the main arm with a pivot shaft to rotate in swinging movement in a horizontal plane;
    a damping plate made of an electrically conductive material having a substantially arcuate shape and secured to said main arm projecting in a lateral direction thereof;
    a damping unit having a pair of permanent magnets with a gap therebetween for insertion therein of said damping plate to form a magnetic field within said gap, said damping plate being displacable in the gap between the permanent magnets with swinging motion of the main arm; support means for supporting the damping unit in a position whereby the damping plate being insertable into the gap between the permanent magnets;
    a leaf spring supported at a first end thereof at said main arm whereby a second free end being adapted to vibrate in a horizontal plane and extends in a longitudinal direction of the main arm; and
    a weight being secured to said second end of said leaf spring.

2. A record player as claimed in claim 1, further comprising: a first block for holding said pivoting means being rotatable integrally with the main arm in a vertical plane; said support means being defined by a horizontal shaft provided integrally with said first block; and a second block for bearing upon said supporting means so that the main arm, first block, and damping unit rotate in the vertical plane.

3. A record player as claimed in claim 2 further comprising: a base structure; and means for adjustably supporting the second block with respect to the base structure.

4. A record player comprising:
    a tone arm having a main arm and a sub-arm; said sub-arm being pivotably mounted with a shaft on a forward end of the main arm to rotate in swinging movement in a vertical plane and having a pickup cartridge mounted thereon;
    pivoting means for pivoting the main arm with a pivot shaft to rotate in swinging movement in a horizontal plane;
    a damping plate formed of an electrically conductive material secured to said sub-arm to project in a vertical direction thereof;
    a damping unit formed of a pair of permanent magnets having a gap therebetween for insertion therein of said damping plate to form a magnetic field within said gap, said damping plate being displacable in the gap between the permanent magnets with swinging motion of the sub-arm, and said damping unit being supported by the main arm.

5. A record player as claimed in claim 4, comprising: an elastic member being supported substantially at one end thereof at said sub-arm and having another free end and a weight secured thereto.

* * * * *